(12) United States Patent
Hrovat et al.

(10) Patent No.: US 6,716,136 B2
(45) Date of Patent: Apr. 6, 2004

(54) POWERTRAIN CONTROL METHOD FOR MINIMIZING EFFECTS OF ENGINE TORQUE DISTURBANCES

(75) Inventors: Davorin David Hrovat, Ann Arbor, MI (US); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/232,554

(22) Filed: Aug. 29, 2002

(65) Prior Publication Data

US 2004/0043866 A1 Mar. 4, 2004

(51) Int. Cl.$^7$ .................. B60K 41/04; B60K 41/02; G06F 17/00; G06F 19/00; G06F 7/00
(52) U.S. Cl. .................. 477/100; 477/107; 477/181; 477/902; 701/54
(58) Field of Search ................. 477/100, 107, 477/181, 174, 902, 906; 701/53, 54; 74/356; 123/90.1

(56) References Cited

U.S. PATENT DOCUMENTS

| | | | |
|---|---|---|---|
| 4,492,195 A | * | 1/1985 | Takahashi et al. ..... 123/339.11 |
| 5,123,302 A | * | 6/1992 | Brown et al. ............. 477/154 |
| 5,243,881 A | | 9/1993 | Hayashi |
| 5,303,794 A | * | 4/1994 | Hrovat et al. ............. 180/197 |
| 5,484,353 A | * | 1/1996 | Lux et al. ................. 477/169 |
| 5,882,279 A | | 3/1999 | Ueki |
| 6,063,004 A | | 5/2000 | Ibamoto et al. |
| 6,076,353 A | | 6/2000 | Freudenberg et al. |
| 6,079,204 A | | 6/2000 | Sun et al. |
| 6,188,944 B1 | * | 2/2001 | Kolmanovsky et al. ........ 701/54 |
| 6,254,510 B1 | * | 7/2001 | Rauch et al. ............... 477/132 |
| 6,386,351 B1 | * | 5/2002 | Salecker et al. ........... 192/54.1 |

\* cited by examiner

*Primary Examiner*—Tisha D Lewis
(74) *Attorney, Agent, or Firm*—Allan J. Lippa; Kolisch Hartwell, P.C.

(57) ABSTRACT

A system is described for minimizing engine torque disturbances that would otherwise cause degraded drive feel by a vehicle driver. The system utilizes multiple torque transmission paths of a transaxle unit mounted to the engine. The system manipulates the torque transmitted by adjusting the clutches of multiple torque transmission paths so that the torque disturbance in the engine results in relatively constant vehicle drive torque. In one example, a potential torque increase due to a change in engine air-fuel ratio is minimized by transmitted torque through multiple transmission paths.

21 Claims, 4 Drawing Sheets

POWERTRAIN CONTROL METHOD FOR MINIMIZING EFFECTS OF ENGINE TORQUE DISTURBANCES

FIELD OF THE INVENTION

The present invention relates to a system and method for minimizing torque disturbances cause by changes in engine operation such as changes in engine air-fuel ratio or injection timing.

BACKGROUND OF THE INVENTION

Vehicle control systems typically attempt to minimize torque disturbances so that a driver's comfort and drive feel are not degraded during vehicle operation. One such torque disturbance is when an engine changes air-fuel ratio such as, for example, when changing from lean to rich to release and reduce NOx stored in a downstream catalyst.

One method to minimize such torque disturbances is to change the gear ratio within a single torque path of the transmission. For example, one approach is to change the actual gear ratio of a continuously variable transmission (CVT), as described in U.S. Pat. Nos. 5,243,881, 6,063,004, and 6,188,944. Another such example is to control torque converter lock-up and un-lock action via the torque converter clutch, as described in U.S. Pat. No. 6,079,204.

The inventors herein have recognized a disadvantage with such approaches that attempt to cancel the torque disturbance via adjustments in a single torque path. In particular, these methods require hardware that may not be available on conventional automatic transmissions having only discrete gear ratios. For example, not all vehicles have a CVT. Also, some vehicles may not have a torque converter lock-up clutch.

SUMMARY OF THE INVENTION

The above disadvantages are overcome a method for controlling output of a vehicle powertrain having an engine and a torque transmitting unit with multiple transmission paths including multiple clutches, the vehicle also having a electronic control unit. The method comprises: operating the torque transmitting unit to have a preselected gear ratio; providing an indication of an engine output disturbance; in response to said indication, transmitting torque through said torque transmitting unit via at least two paths, and adjusting a clutch parameter of at least one of the clutches of said torque transmitting unit; and after said torque disturbance ends, operating the torque transmitting unit to have said preselected gear ratio.

By adjusting a clutch parameter, for example, clutch hydraulic pressure, it is possible to transmit torque through multiple paths of the transmission in such a way that the change in input torque causes substantially no change in the output torque. In other words, by changing the pressure, and thus the transmitted torque, in response to the torque disturbance changes the way in which torque is transmitted through the unit, and thus changes the net output torque.

In another example, the method comprises: providing an indication of an engine output disturbance; in response to said indication, applying at least two clutches of said torque transmitting unit; and adjusting a clutch parameter of at least one of said at least two clutches based on an estimate of said engine output disturbance.

Again, by using at least two torque paths through the unit, it is possible to compensate for changes in input torque, and thereby provide a substantially constant output torque. I.e., by varying how much torque is transmitted though the two paths (by changing clutch pressure), this varies the effect of a given input torque on the output.

Note that the present invention can be utilized in combination with other methods that attempt to mitigate variations in engine output torque.

The above advantages, other advantages, and other features of the present invention will be readily apparent from the following detailed description of the invention and the following drawings, taken alone or in combination.

DETAILED DESCRIPTION OF THE INVENTION

Figure 1:
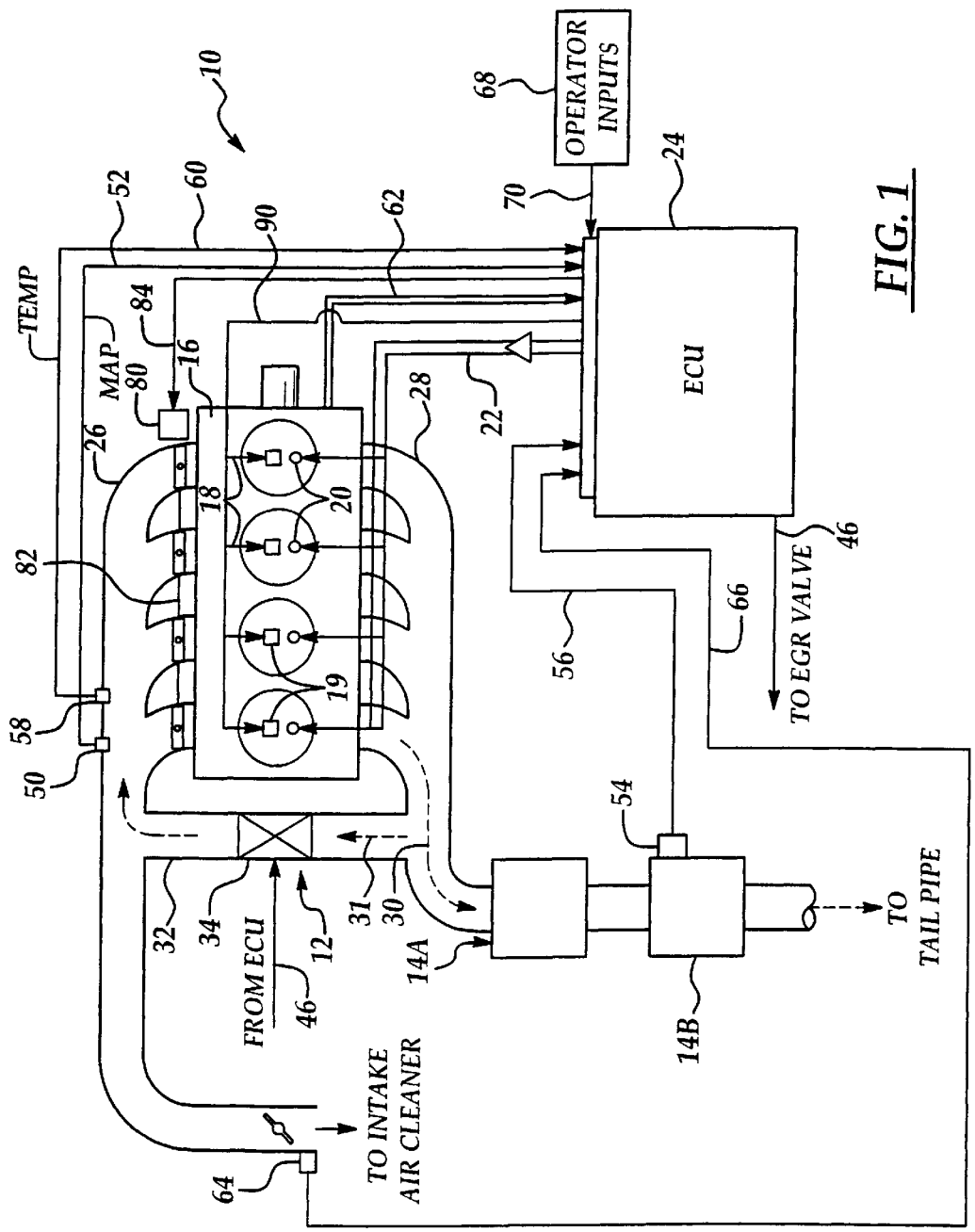
FIGS. 1–2 are a schematic view of an engine system having a transmission in accordance with one embodiment of the present invention.

Turning first to FIG. 1, there is shown a simplified schematic diagram of an engine system 10 equipped with an exhaust gas recirculation (EGR) system 12. The engine exhaust has an upstream catalyst 14A and a downstream catalyst 14B. In the case where engine 10 is a gasoline engine (either directly injected as shown, or port fuel injected), catalysts 14A and 14B can store oxidants (NOx and O2) when operating lean and release the stored oxidants when operating stoichiometric or rich. Alternatively, in the case where engine 10 is a diesel, compression ignition engine, upstream catalyst 14A can be a diesel particulate filter and downstream catalyst 14B can be a lean NOx catalyst, such as an SCR catalyst. Alternatively, only a single catalyst could be used that operates both as a lean NOx catalyst and a particulate filter.

A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions and increase fuel economy, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31, denoted as Wegr. An EGR valve 34 recirculates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

A swirl control valve 80 adjusts position of the swirl valve 82 via control signal 84, sent from controller 24. This valve restricts air entering the combustion chambers, thereby creating different engine combustion burn rates.

All of the engine systems, including the EGR 12, swirl control valve 80, and fuel injectors 20 are controlled by the ECU. For example, signal 46 from the ECU 24 regulates the EGR valve position. Further, controller 24 also control ignition of the spark plugs 19 via a signal 90.

In the ECU 24, the command signals 46, 90, and 22 to the EGR 12 actuator, the ignition coils/plugs, and the fuel injectors are calculated from measured variables and engine operating parameters by means of a control algorithm. Sensors and calibratable look-up tables residing in ECU memory provide the ECU 24 with engine operating information. For example, an intake manifold pressure (MAP) sensor 50 provides a signal (P1) 52 to the ECU indicative of the pressure in the intake manifold 26. Likewise, an intake manifold temperature sensor 58 provides a signal (Tm, or TEMP) 60 to the ECU 24 indicative of the intake manifold temperature. A mass airflow (MAF) sensor 64 also provides a signal (Wth) 66 indicative of the compressor mass airflow to the ECU 24. Further still, sensor 54 provides an indication of downstream catalyst temperature (TEMP) via line 56.

Additional sensory inputs can also be received by the ECU along signal line 62 such as engine coolant temperature, engine speed, and throttle position. Additional operator inputs 68 are received along signal 70 such as the accelerator pedal position or other fueling request input.

In one embodiment, engine 10 has a mechanically driven camshaft that actuates intake and exhaust valves. In another embodiment, engine 10 has an electromechanical actuator coupled to each intake and exhaust valve of the engine, known as a camless engine. In this case, each actuator's opening time, closing time, and even opening amount, can be controlled by the ECU 24. This timing is adjusted based on engine operating conditions and a driver request.

Figure 2:
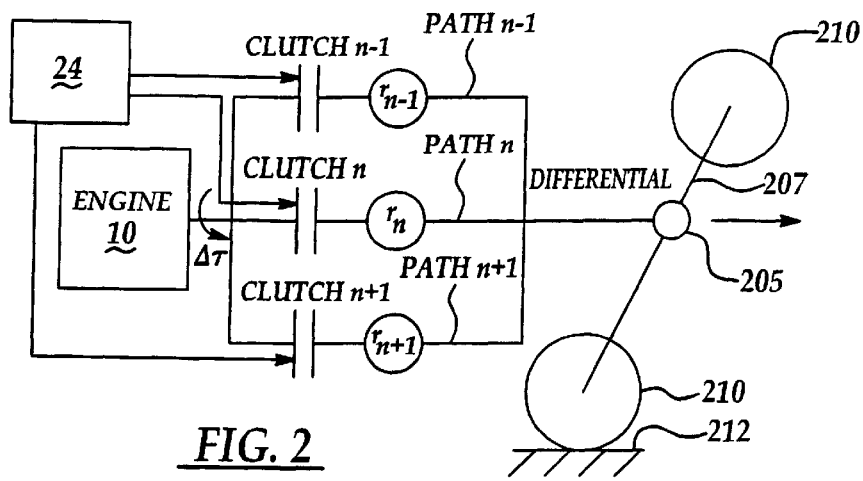

Engine 10 is also coupled to a transmission, or transaxle, unit as shown in FIG. 2. FIG. 2 specifically shows an example of a layshaft automatic transmission 200. However, as described below, any type of conventional automatic transmission having a variety of electronically controlled clutches and torque transmission paths can be used. Transmission 200 is coupled also to differential 205. Differential 205 is coupled to the drive shaft 207. Shaft 207 has two drive wheels (210), which link the powertrain to the road 212.

The example transmission 200 has a variety of transmission paths, shown in this example as paths n−1, n, and n+1. While only three paths are shown, any number of paths can be used. For example, n may be selected as 2, giving a total of four paths.

Each path has a clutch (e.g., clutch n), which is electro-hydraulically controlled via controller 24. While an electro-hydraulic example is shown, any type of electromechanical control could be used. Further, each path as a gear ratio (r) associated with it. In this example, the ratios are related as shown below:

$$r_{n+1} < r_n < r_{n-1}$$

The engine and transmission control methods described herein apply to layshaft transmission as well as conventional planetary gear type automatic transmissions, regardless of the type of fuel used. Thus, it is to be understood that references to gasoline engines are applicable to compression (diesel) ignition engines as well, and vice versa. In addition, throughout the specification, the following notations are used in describing measured or calculated variables:

| | |
|---|---|
| N | engine speed (RPM) |
| MAP | intake manifold pressure (MAP) (kPa) |
| Wth | mass flow rate (MAF) (kg/s) |
| Wegr | EGR mass flow rate (kg/s) |
| Wf | fuel mass flow rate (kg/h) |
| AFR | desired air/fuel ratio |
| $AF_s$ | stoichiometric air/fuel ratio (about 14.6) |
| $X_{egr}$ | EGR valve position |
| $\tau_n$ | clutch output torque for clutch n |
| $\omega_n$ | clutch slip for clutch n |
| $p_n$ | clutch pressure for clutch n |
| $r_n$ | gear ratio for path n |
| $\Delta\tau$ | torque disturbance (increase in engine torque) |

Figure 3:
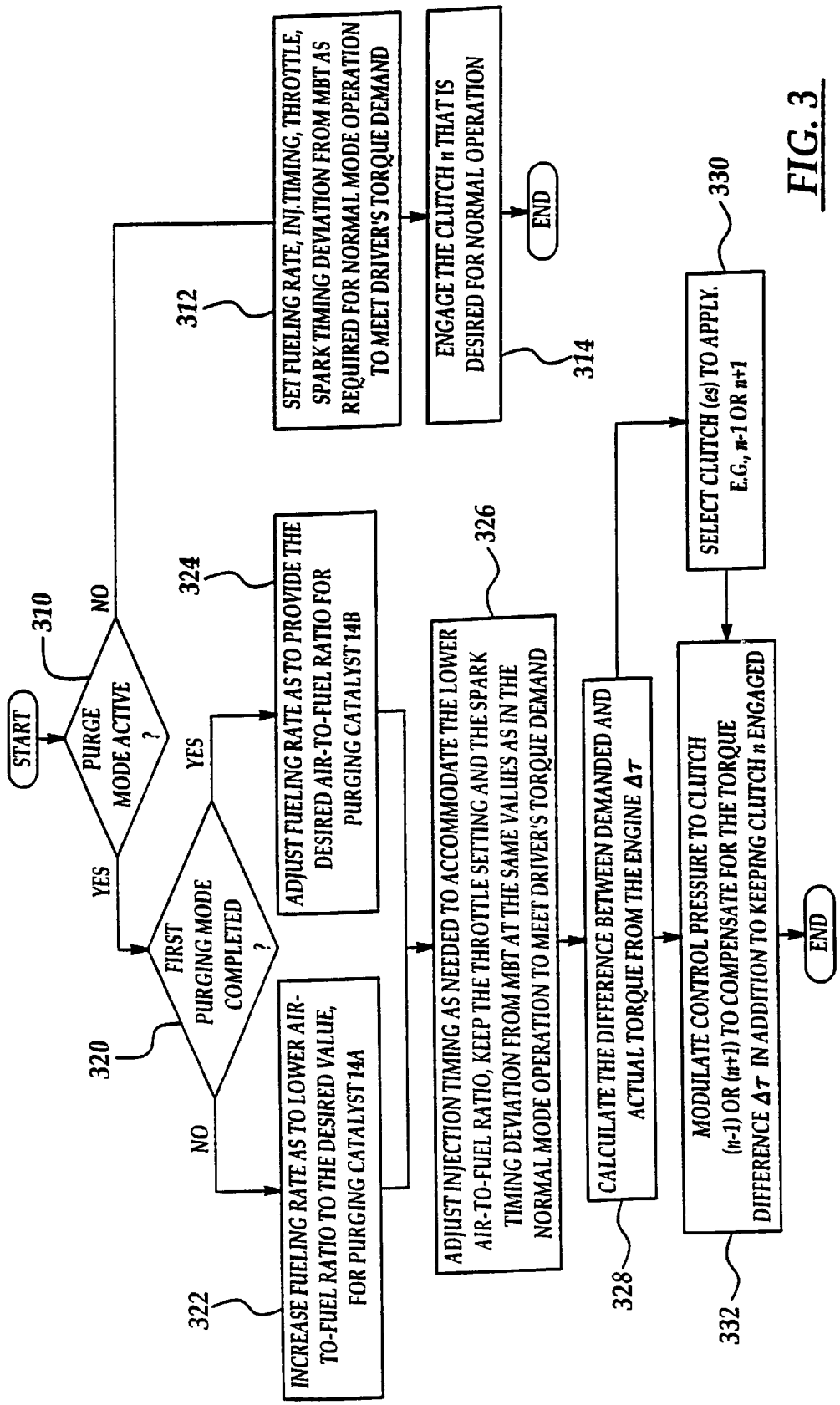
FIGS. 3, 4, and 6 are block diagrams of an engine control system in accordance with one embodiment of the present invention.

The disclosed engine control method can be implemented in a modular fashion with existing engine control schemes as shown in FIG. 3.

Note that in one aspect of the present invention, where engine 10 is a lean burn engine, engine torque disturbances related to air-fuel ratio changes are minimized. In particular, lean-burn gasoline engines operate with an air-to-fuel ratio lean of stoichiometry to improve fuel economy. The fuel economy improvements are obtained because the same torque output level can be maintained at a higher intake manifold pressure than for stoichiometric operation and, therefore, with lower pumping losses. The stratified charge operation in direct injection gasoline engines enables very high air-to-fuel ratios, up to 50:1 and sizable reductions in the fuel consumption. This stratified charge operation is achieved via the late injection timing while the early injecting timing can be used to effect a homogeneous fuel-air charge inside the cylinder. With the homogeneous charge the engine can be operated with the air-to-fuel ratio up to about 20:1 with less fuel savings but over a wider range of engine speeds and loads.

As described above the downstream catalyst 14B (and to some extent 14A) stores NOx during lean operation but as it becomes full its efficiency drops. To regenerate this efficiency, it is necessary to operate the engine with a rich air-to-fuel ratio for a few seconds. This operation is referred to as purging the catalyst. The transition from lean air-to-fuel ratio to rich air-to-fuel ratio should be accomplished with no noticeable disturbance to the driver. If the vehicle is cruising steadily on a highway, this means that the torque delivered by the powertrain to the wheels should be maintained at a relatively constant level.

The present invention proposes a solution that does not require additional hardware components (such as a CVT or integrated starter alternator), only the components of the standard automatic transmission. The present invention is based on the following features in the example of a lean-burn gasoline engine:

a. Increasing the fueling rate (either instantaneously or in a ramp-like fashion) and changing the fuel injection timing as needed to transition to homogeneous combustion at a lower air-to-fuel ratio for purge while keeping throttle and deviation of spark timing from MBT spark timing at the same settings as during the normal operation. This increase in the fueling rate generates an increased torque output from the engine.

b. Appropriately controlling the power flow from the engine to the wheels by engaging clutches of the automatic transmission so that no torque disturbance is passed to the wheel. This flow control is accomplished by engaging two or more clutches of the automatic transmission.

c. Decreasing the fueling rate after the purge and appropriately changing the fuel injection timing to return to the normal operation after the purge is completed.

The advantage of the invention is that the transition into catalyst purge mode can essentially be enacted instantaneously and the air-to-fuel ratio can be modulated with fuel as needed for the most efficient purge. The torque disturbance from the engine is taken care of by engaging an additional clutch in the transmission. For example, in the aftertreatment configuration of FIG. 1, the initial portion of the purge is concerned with purging upstream catalyst 14A and is done at a lower air-to-fuel ratio than the air-to-fuel ratio at which NOx is most efficiently purged out of downstream catalyst 14B.

Note that, while the above description refers to the specific torque disturbance of a lean-burn gasoline engine, the method according to the present invention is applicable to other torque-disturbances as well. For example, any torque increase into the transmission can be diminished according to the present invention. I.e., in the case of a diesel engine with a diesel particulate filter (DPF), a problem is to light-off the DPF during regeneration. This can also be handled with the present invention.

The present invention is described with a reference to a layshaft automatic transmission configuration. However, the underlying principles apply equally well in the case of a more conventional, planetary-gear transmission.

The layshaft transmission configuration is shown in FIG. 2, where (without loss of generality) it is assumed that a Hondamatic-type of a transmission without a torque converter is used with each gear (n) having one associated clutch "n" with a gear ratio $r_n$, which represents the torque amplification from transmission input to transmission output, as describe above. Moreover, it is assumed that the vehicle is operating in gear n, which is neither the top nor the bottom gear—i.e., it is somewhere in the "middle".

For example, suppose that the DISI strategy pre-announces (possibly a few seconds or less ahead) the intent to switch from a stratified to homogeneous mode during a positive wheel torque operation ("power-on" case). Typically, this may result in some engine net torque increase ($\Delta\tau$) for a few seconds or less. The effect of this torque increase on wheel torque can be reduced or in an ideal case completely neutralized by applying an appropriate amount of clutch (n+1) torque. This situation is similar to the toque (exchange) phase in the case of (power-on) upshifts. Assuming (without loss of generality) that the engine speed does not change during this torque application, the required clutch (n+1) output torque $\tau_{n+1}$ that is needed to cancel the effect of $\Delta\tau$ at transmission output (or, equivalently, at the wheels) is equal to:

$$\tau_{n+1}(p, \omega_{n+1}, T) = \Delta\tau^* r_n/(r_n - r_{n+1}) \qquad (1)$$

The required clutch output torque $\tau_{n+1}$ can be generated by appropriately modulating the control pressure p applied to the clutch. Recall that the clutch output torque is primarily a function of control pressure p and, to a lesser degree of a friction coefficient that in turn depends on clutch slip $\omega_{n+1}$, temperature T and other factors. Note that the temperature/thermal and related influence may be more important during the initial stroking (which would be more frequent for the present application), especially at lower temperatures. To compensate for these viscous effects, an appropriate model or approximation could be used. Specifically, for any slipping clutch with slip velocity $\omega$, the control pressure that need to be applied, p, can be determined from the expression:

$$P = \tau_d/[AN_s r_e \tau_f(\omega)\mu],$$

where A is the area of clutch friction surface, $N_s$ is the number of friction surfaces, $r_e$ is the effective radius of the clutch, $\mu$ is the friction coefficient, and $\tau_d$ is the desired clutch output torque. The $\tau_f$ is the generalized Stribeck friction function of the slip, i.e., $$\tau_f(\omega) = [1 + (T_s - 1)e^{-|\omega/\omega_s|^\delta} + b_v|\omega|]\text{sgn}(\omega)$$

where $T_s$ is the value of the torque at the so called breakaway point, $\omega_s$ is the Stribeck speed, $\delta$ is the Stribeck factor, and $b_v$ is the normalized viscous friction coefficient.

Note that under the above assumptions, the torques from clutch n and (n+1) have the same sign at the transmission output, and the resulting torque reduction is obtained by virtue of the fact that a portion of the input torque is now taken through a path with a smaller gain, i.e., $r_{n+1} < r_n$. In this sense, the clutch (n+1) can be seen as an actuator with a finer resolution. On the other hand, clutch (n−1) can serve as a large authority actuator since its output torque acts through a stronger gain $r_{n-1} > r_n$, and also the resulting output torque subtracts from clutch n torque due to the different direction of across-the-clutch slip between clutches n and (n−1).

In view of the above, the clutch (n−1) output torque increase that is required to fully counteract an input torque increase of ($\Delta\tau$) can be calculated by substituting ($-r_{n-1}$) for $r_{n+1}$ in Eq. 1 to yield:

$$\tau_{n-1}(p, \omega_{n-1}, T) = \Delta\tau^* r_n/(r_n + r_{n-1}) \qquad (2)$$

Note that due to the above sign change, the clutch (n−1) torque needs to increase much less than in the case of the (n+1) clutch, for the same input torque increase $\Delta\tau$. For example, using the data for a known transmission ($r_2$=1.571, $r_3$=1, $r_4$=0.698) it can be calculated that the ratio of the two clutch torques when operating in the $3^{rd}$ gear (i.e., n=3) is, $$\tau_{n-1}/\tau_{n+1} = (r_n - r_{n+1})/(r_n + r_{n-1}) = (r_3 - r_4)/(r_3 + r_2) = 0.118 \qquad (3)$$

from which it can be seen that the required torque for clutch (n−1) is almost an order of magnitude smaller.

One possible advantage of using clutch (n−1) is that the clutch energy dissipation is typically smaller than when an equivalent output torque effect is produced with the clutch (n+1). It can be shown that the ratio of the related two power dissipations is, $$P_{n-1}/P_{n+1} = (r_n - r_{n+1})/(r_n + r_{n-1}) = (r_2 - r_3)/(r_3 + r_2) = 0.22, \qquad (4)$$

where the last result is obtained for the above known transmission operating in the $3^{rd}$ gear. It can be seen that in this case the power dissipation using clutch 2 amounts to only 22% of the power dissipated by using clutch 4. This will result in corresponding fuel economy savings. In general, the clutch (n−1) would be used when larger and/or longer duration torque reduction is required, whereas clutch (n+1) would be used for faster and smaller interventions (due to larger torque levels used here, the related clutch bandwidth will also typically be larger). Obviously, the two could also be combined as appropriate.

The present invention contains a further provision of generating the control pressure to the additional clutch as a function of the difference between measured engine speed and desired engine speed or measured wheel speed and desired wheel speed. This provision applies in the instances when purge is desired while at the same time the cruise control is active. Further provisions of this invention apply in a situation when a torque sensor is available in the output of the transmission. In this case the control pressure to the additional clutch can be controlled as a function of the difference between the measured and desired torque.

Note that the present invention operates to change the path of the torque transmission, in variable amounts, between paths with different gear ratios. However, the present invention is not necessarily attempting to shift the gear ratios. For example, the gear ratio before and after the torque disturbance can be the same gear ratio, unlike a conventional "shift", where the gear ratio after application, or deactivation, of clutches is different. In other words, the gear ratio of the transmission is the same before and after torque disturbance occurs. I.e., before the torque disturbance commences, and after is subsists (and the second torque transmission path is discontinued), the gear ratio can still be the same. Thus, according to the present invention, it is possible to minimize engine torque, or power, disturbances by using manipulating the torque transmit through multiple paths of an automatic transaxle. This manipulation is performed by adjusting the application of clutches in the transaxle, even if the transaxle is not shifting gear ratios, i.e., even when the present gear is to be maintained.

In other words, by applying multiple clutches, and adjusting the clutch pressure (thereby adjusting how much torque is transmitted), it is possible to obtain relatively constant torque output at the drive wheels even when engine torque is increasing significantly. In this way, the vehicle drive torque is substantially unaffected by the disturbance and the vehicle driver's perception of the disturbance is minimized. For example, the variation in drive torque at the drive wheels is less than five percent of the total drive torque, even with a significant change in engine torque.

Referring now to FIG. 3, a routine describing operation according to the present invention is described. First, in step 310, a determination is made as to whether the catalyst purge mode is active. When the answer to step 310 is "no", the routine continues to step 312 where the fueling rate, the injection timing, the throttle angle, the spark timing deviation from maximum torque timing (MBT) are set as required for normal mode operation to meet the driver's torque demand. Then, in step 314, the routine engages the clutch end that is desired for a normal operation.

When the answer to step 310 is "yes", the routine continues to step 320. In step 320, the routine determines whether the first purging mode is completed. In other words, the routine determines in step 320 whether the first, lesser rich air-fuel ratio operation to first purge upstream catalyst 14A is completed. When the answer to step 320 is "no", the routine continues to step 322. In step 322, the routine increases the fueling rate as to lower the air-fuel ratio to the desired rich value for purging catalyst 14A. When the answer to step 320 is "yes", the routine continues to step 324 and adjusts the fueling rate as to provide the desired air-fuel ratio for purging the catalyst 14B.

Continuing with FIG. 3, the routine continues to step 326. In step 326, the routine adjusts the injection timing as needed to accommodate the lower air-fuel ratio, while keeping the throttle setting and the spark timing deviation from optimum timing as in the normal mode of operation to meet the driver's torque demand. Then, in step 328, the routine calculates the difference between the required or demanded and actual torque from the engine ($\Delta\tau$). In one example, the demanded engine torque is determined based on at least one of a driver demanded torque, desired idle speed control torque, desired cruise control torque, and desired traction control torque. Then, the routine continues to step 330. In step 330, the routine selects the clutch or clutches to apply. For example, the routine determines whether to apply clutch n−1, or clutch n+1. For example, as described above herein, if fuel economy requirements are taken into consideration, then the clutch corresponding to the higher gear ratio is selected. Alternatively, if a larger torque disturbance is expected, then the clutch with the lower gear ratio can be selected. From step 330, the routine continues to step 332. In step 332, the routine controls clutch pressure to the selected clutch path to compensate for the torque disturbance in addition to keeping the current clutch end engaged.

Regarding step 332, note that after the torque disturbance subsides ($\Delta t$ is less than a preselected calabratable amount), the modulation of the applied clutch (n−1, or n+1 as the case may be) is discontinued (i.e., the applied clutch is disengaged and all torque is transmitted through the original torque transmission path, path n in this example).

Another application of the transmission control method described above is to diesel engine particulate filter regeneration, referred herein as DPF regeneration.

DPFs are an after-treatment component that deals with diesel engine particulates. The particulates are stored in the DPF during normal engine operation, but when their amount grows excessive (as detected by an increase in pressure drop across DPF), the engine management system regenerates the DPF by burning the stored particulates.

The burn is self-sustaining once the particulates in the DPF are lit-off. To light-off the DPF, the exhaust temperature needs to be temporarily increased above a threshold value.

In diesel engines achieving a sufficiently high exhaust heat flux can be difficult, especially at low engine torque outputs. It typically requires a combination of measures such as closing intake throttle, adjusting start of injection (SOI), and increasing idle speed. The light-off can be done easier at higher engine torque outputs.

With the transmission control method described in this invention it is possible to temporarily increase engine torque output above the driver torque demand while removing the torque difference by the transmission action so that the vehicle operation is not affected and the vehicle driver and passengers do not take a notice. The increase in engine torque output via the increase in the fueling rate also increases the exhaust heat flux and therefore allows to light-off the DPF.

As a result, the DPF light-off can be effected during low driver torque demand phases where it may otherwise not be possible without excessive application of other measures.

At part driver torque demand operation, the DPF light-off can be accomplished with conventional measures, but by combining it with the transmission control method of this invention, it can be accomplished faster.

The sequence of main steps can be summarized as follows:
1. Request a regeneration of the DPF to be initiated based on pressure drop across DPF exceeding a pre-determined amount,
2. Increase fueling rate to the engine to generate larger heat flux output from the engine, and
3. Control the transmission as described transmission to cancel the torque output increase as described in this invention.

Figure 4:
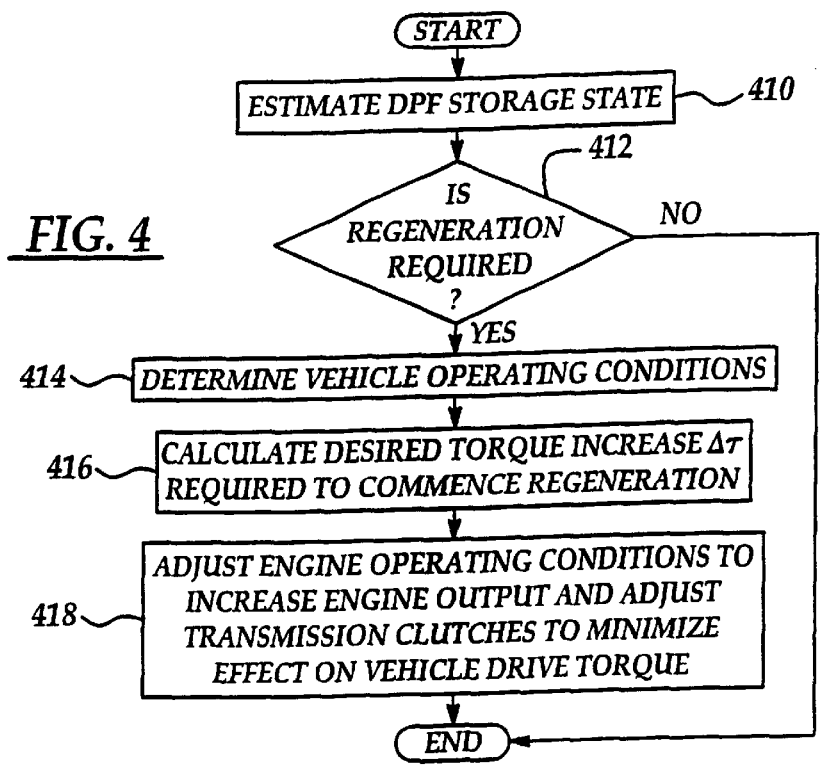

The amount of torque increase for DPF regeneration can be calibrated as a function of estimated exhaust gas temperature, or based on engine speed and load. In other words, at lower exhaust gas temperatures, a greater torque increase can be requested than at higher exhaust gas temperature. The transmission is then controlled to minimize this torque increase as described in the equations above. Such a routine is now described more fully with regard to FIG. 4.

First, in step 410, the routine estimates the DPF storage state. This can be done based on the pressure drop across the filter. Alternatively, a storage estimator can determine the amount of stored particulates based on engine and vehicle operating conditions such as the amount of particles generated, exhaust temperatures, and particulate storage capacity. Further, this estimate can take into account self-started particulate regeneration.

Next, in step 412, the routine determines whether control action should be taken to regenerate the particulate filter. For example, when the pressure drop reaches a predetermined threshold (which can vary with vehicle mileage, etc.). Alternatively, such action can be scheduled at predetermined intervals, or based on when the estimated amount of stored particles reaches a predetermined value.

When the answer to step 412 is YES, the routine continues to step 414 where vehicle operating conditions are determined, such as, for example: vehicle speed, engine speed, engine load, transmission state, exhaust gas temperature, etc. These values are then used in step 416 to calculate the desired torque increase required to commence regeneration. For example, the variables can be mapped to provide the required torque increase for a given conditions that will generate a high enough exhaust gas temperature to start particulate filter regeneration.

Finally, in step 418, the routine then adjusts engine operating conditions to increase torque output to the desired level calculated in step 416. This can be done by adjusting fuel injection amount, reducing EGR, or adjusting injection timing. Further, as described above, this can be combined with throttling to generate additional heat. Also, the transmission clutches are then adjusted as described above to provide multiple torque paths for the engine torque to reach the drive wheels. In this way, the effect on the drive wheels (of the engine torque increase) is minimized.

Yet another aspect of the present invention relates to camless engine technology, where at least one of an engine intake and/or exhaust valve is electronically (e.g., electro-mechanically) controlled. In this case, engine airflow is controlled primarily via the intake valve closing (either early or late). If the torque demand becomes low, the engine demand for air is also becomes low and IVC timing is adjusted to force the intake valve to close earlier. However, at high engine speeds and low torque demand conditions, the time required between opening and closing of the intake valve may become excessively small so that the actuators (that have a finite speed of response) can no longer deliver it.

At these conditions, late intake valve closing strategy (with valve closing past BDC in compression stroke) is typically employed. In LIVC, more charge is drawn in than needed and then the excess is pushed back into the intake manifold by upward piston motion (see FIG. 5). The transition between early intake valve closing (EIVC) operation and late intake valve closing (LIVC) operation as may be required as a result of the driver torque demand drop at high engine speeds is difficult to manage. When the air-fuel charge starts to be pushed back into the intake manifold from the cylinder, it disturbs the air-to-fuel mixture in the intake ports and affects in a difficult to predict way the fuel evaporation and wall-wetting characteristics. Thus, deviations in the exhaust air-to-fuel ratio may occur which may cause degraded catalyst performance and tailpipe emissions. Note also that the need for LIVC operation occurs mostly during transients and is for short periods of time.

The present invention therefore uses the transmission control method described above, where the engine torque output can be temporarily maintained at levels higher than the actual engine torque demand to enable the engine to continue in EIVC operation instead of transitioning into LIVC mode.

The difference between the engine torque demand and actual torque output is managed by the transmission action described above so that any disturbance to the vehicle operation is minimized and the driver/passenger does not take notice. At the same time, transient air-fuel ratio excursions caused by EIVC to LIVC transitions and negative impact on emissions can be avoided.

Figure 5:
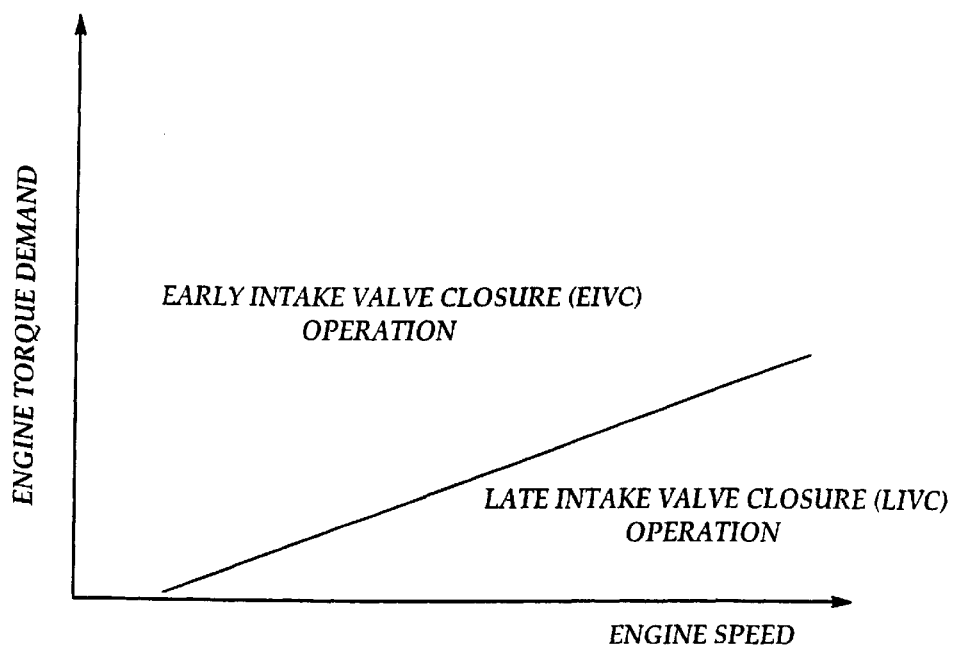
FIG. 5 is a graph illustrating early intake valve closing and late intake valve closing operating regions.
Figure 6:
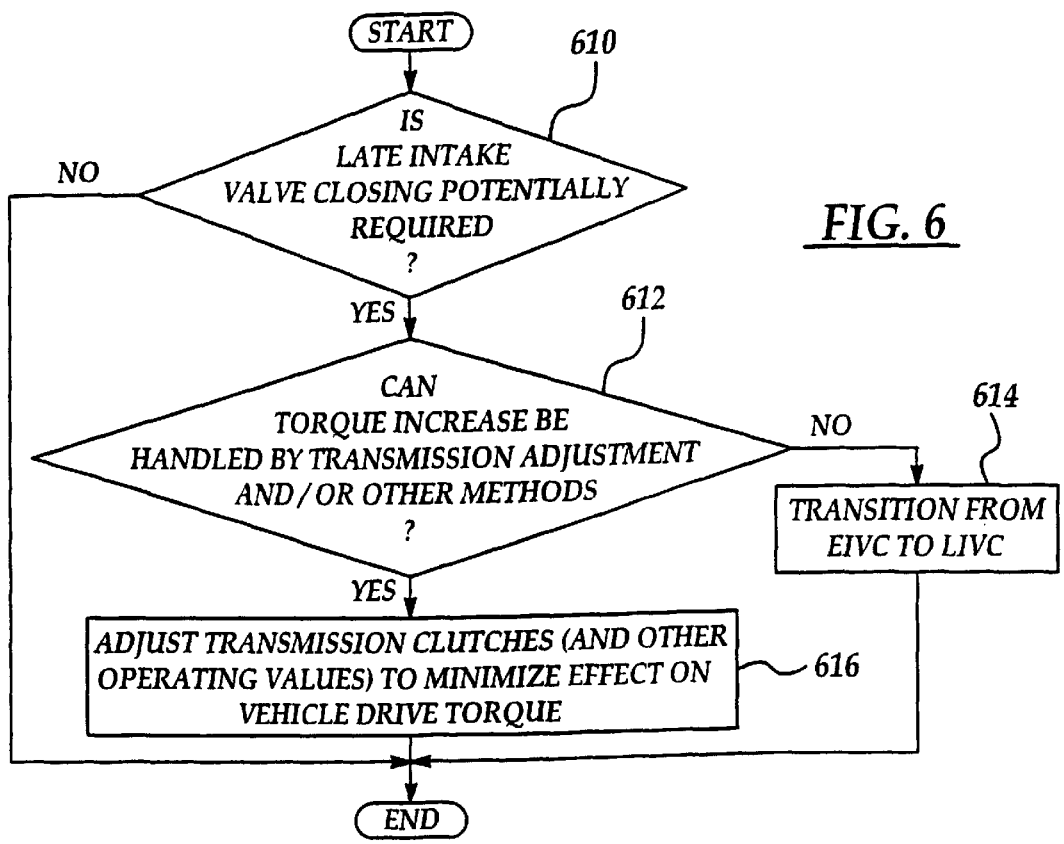

This aspect is described below with specific reference to FIG. 5, which shows the different operating regions of the EIVC and LIVC as a function of engine speed and engine torque. FIG. 6 describes a routine for implementing the method according to the present invention.

First, in step 610, a determination is made as to whether late intake valve closing may potentially be required. For example, based on engine speed and load. Alternatively, this can be determined by monitoring intake valve closing timing, engine output, or other such parameters. When it may potentially be required, a determination is made in step 612 whether the torque increase that may occur (e.g., if LIVC is not utilized) can be compensated for by adjustment of the transmission clutches as described above, either alone or in combination with other methods such as adjusting injection timing, adjusting EGR amount, etc.

When the answer to step 612 is NO, the routine continues to step 614 to adjust timing from early to late intake valve closing (LIVC). Otherwise, in step 616, the transmission clutches are then adjusted as described above to provide multiple torque paths for the engine torque to reach the drive wheels. In this way, the effect on the drive wheels (of the engine torque increase) is minimized. In addition, other methods for minimizing this torque increase can be used in combination with the transmission adjustment.

Note that there are various alterative embodiments of the present invention. For example, a torque converter can be placed between the engine and the transmission, so that the engine is coupled to the transmission through a torque converter.

We claim:

1. A method for controlling output of a vehicle powertrain having an engine and a torque transmitting unit with multiple transmission paths including multiple clutches, the vehicle also having a electronic control unit, the method comprising:
    operating the torque transmitting unit to have a preselected gear ratio;
    providing an indication of an engine output disturbance;
    in response to said indication, transmitting torque through said torque transmitting unit via at least two paths, and adjusting a clutch parameter of at least one of the clutches of said torque transmitting unit; and
    after said engine output disturbance ends, operating the torque transmitting unit to have said preselected gear ratio.

2. A method for controlling output of a vehicle powertrain having an engine and a torque transmitting unit with multiple transmission paths including multiple clutches, the vehicle also having a electronic control unit, the method comprising:
    providing an indication of an engine output disturbance;
    in response to said indication, applying at least two clutches of said torque transmitting unit; and adjusting a clutch parameter of at least one of said at least two clutches based on an estimate of said engine output disturbance.

3. The method recited in claim 2 wherein said engine output disturbance is initiated by the electronic control unit.

4. The method recited in claim 2 wherein said engine output disturbance is an engine torque disturbance.

5. The method recited in claim 2 wherein said engine output disturbance is initiated by the electronic control unit based on a condition of an emission control device of the vehicle.

6. The method recited in claim 5 wherein said emission control device is a catalytic converter for gasoline engines.

7. The method recited in claim 5 wherein said emission control device is a particulate filter.

8. The method recited in claim 2 wherein one of said clutches is already being applied before said disturbance occurs.

9. The method recited in claim 2 wherein a gear ratio of said torque transmitting unit is the same before and after torque disturbance occurs.

10. The method recited in claim 2 wherein said adjusting further comprises adjusting a clutch hydraulic pressure.

11. A system for a passenger vehicle, comprising:
an engine;
a torque transmitting unit having at least a first and second torque transmission path coupled to said engine, with said at least two torque transmission paths having a clutch that affects torque of said respective path; and
a control unit for providing an indication of an engine torque output disturbance, applying at least two clutches, with a first clutch being applied before said indication and a second clutch being applied in response to said indication, and adjusting a clutch parameter of at least one of the first and second clutches based on said engine torque output disturbance so that a vehicle drive torque is substantially unaffected by said torque disturbance.

12. The system of claim 11 further comprising an emission control device coupled to said engine.

13. The system of claim 12 wherein said emission control device is a catalyst that can retain oxidants when operating lean and reduce said oxidants when operating stoichiometric or rich.

14. The system of claim 13 wherein said controller causes said torque disturbance to change engine operation from lean to rich.

15. The system of claim 12 wherein said emission control device is a diesel particulate filter.

16. The system of claim 13 wherein said controller causes said torque disturbance to change engine operation to raise temperature of said filter, thereby burning stored particles and regenerating an ability of said catalyst to store particles.

17. The system of claim 16 wherein said engine is a diesel engine.

18. The system of claim 11 wherein said clutch parameter is a hydraulic clutch pressure.

19. The system of claim 11 wherein said clutch parameter is a hydraulic clutch pressure of said second clutch.

20. The system of claim 11 wherein said controller further disengages said second clutch after said torque disturbance subsides.

21. The system of claim 11 wherein said torque transmitting unit includes an automatic transmission.

* * * * *